May 6, 1947. W. C. LAUGHLIN 2,420,180
APPARATUS AND METHOD FOR HYDRAULIC CONCENTRATION
Filed Sept. 14, 1943 3 Sheets-Sheet 3
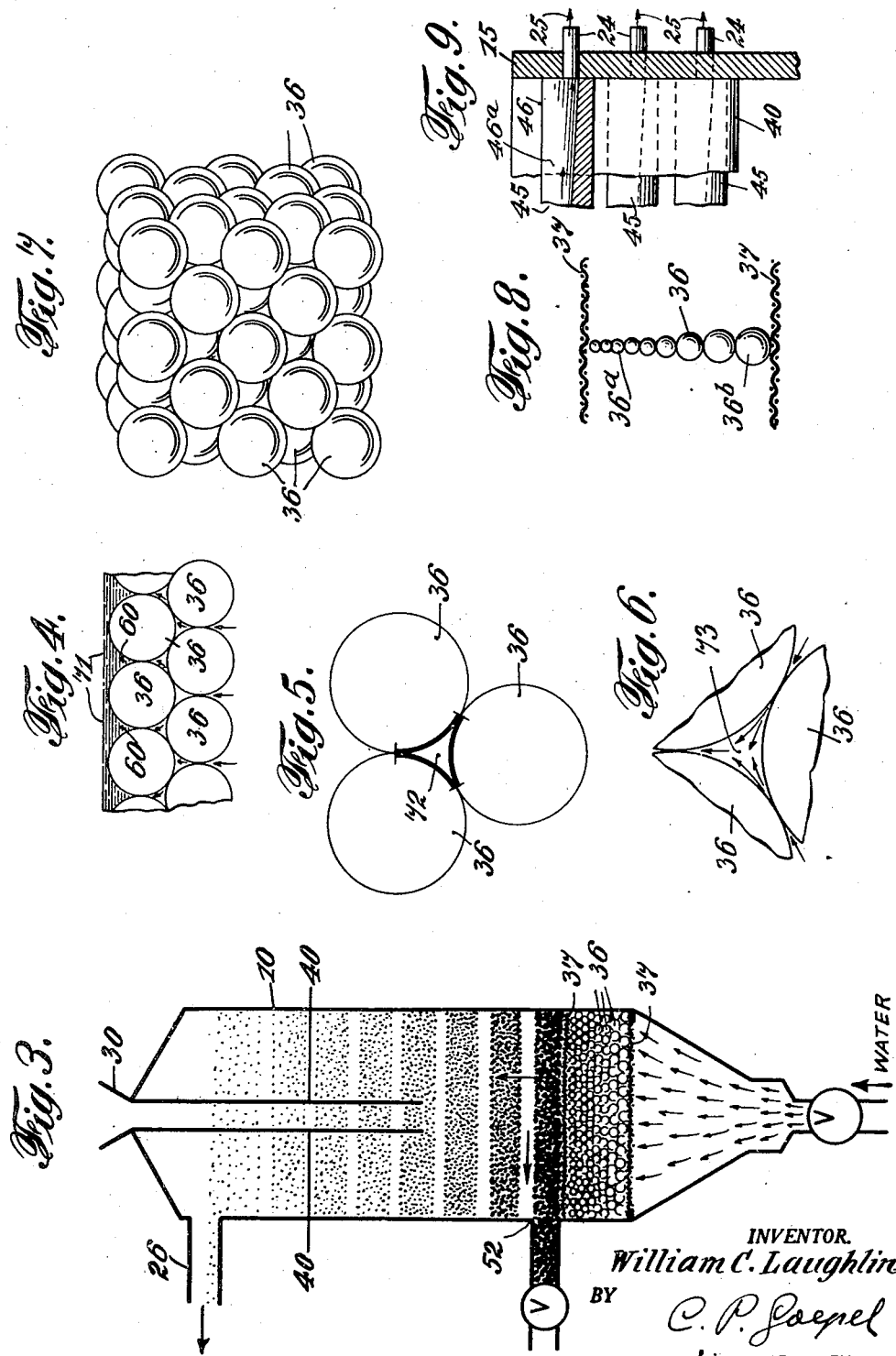
INVENTOR.
William C. Laughlin
BY
C. P. Goepel
his ATTORNEY Patented May 6, 1947

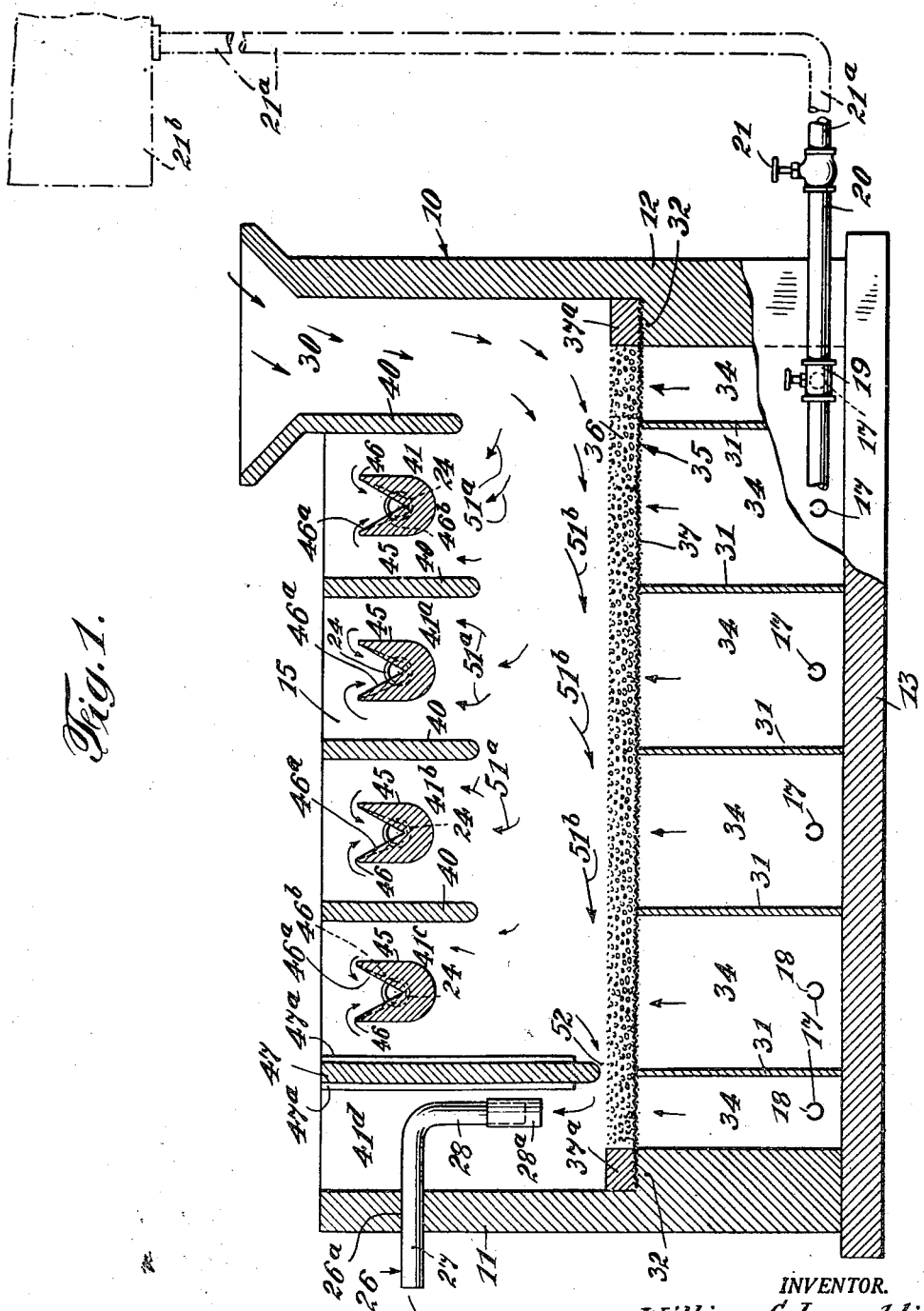

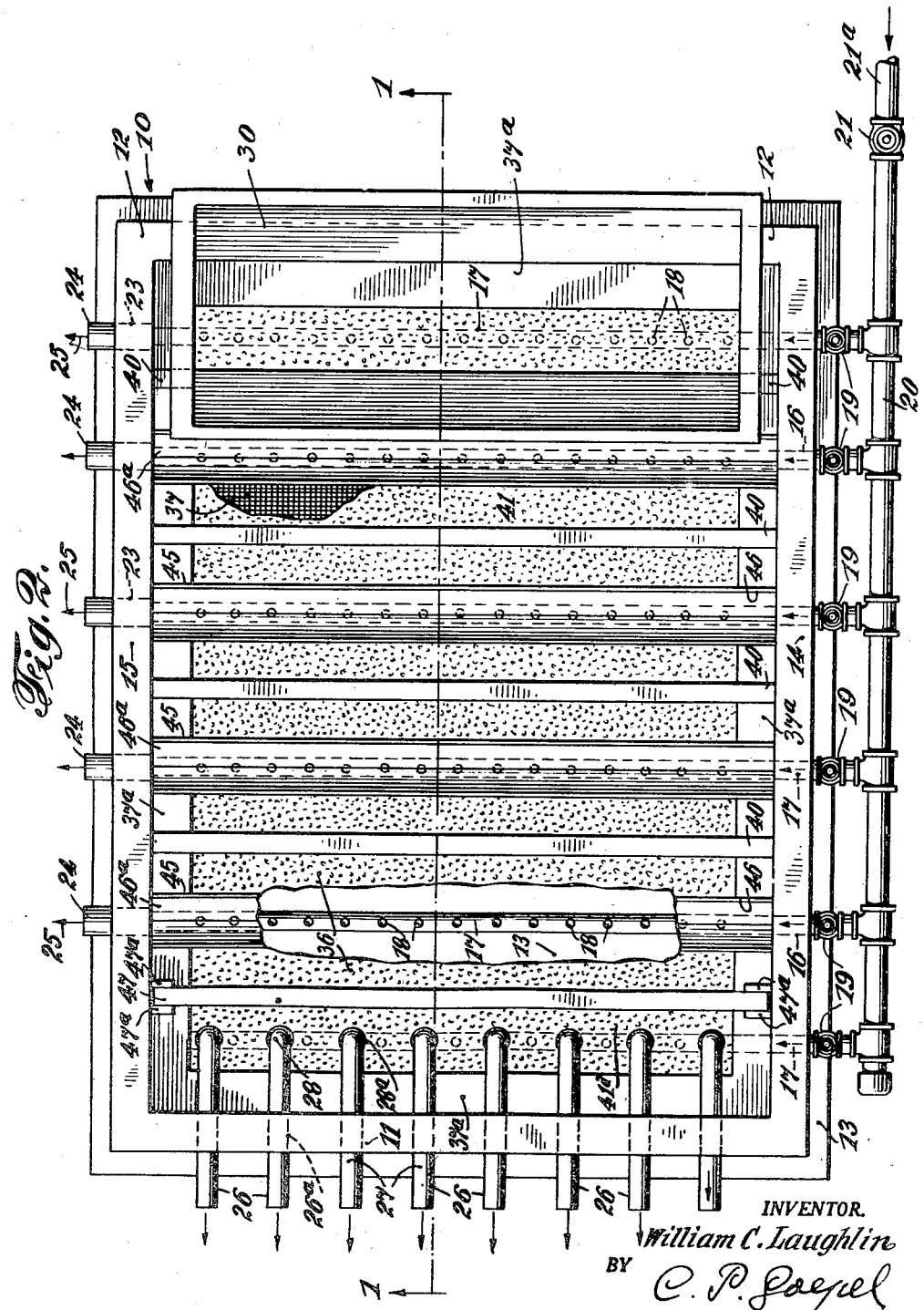

2,420,180

UNITED STATES PATENT OFFICE 2,420,180

APPARATUS AND METHOD FOR HYDRAULIC CONCENTRATION

William C. Laughlin, New York, N. Y.

Application September 14, 1943, Serial No. 502,244

2 Claims. (Cl. 209—454)

This invention relates to classifiers and separators and has for its object to provide a method of classification and separation, and an apparatus embodying novel functions, to overcome the objections of the devices now in use.

The improved apparatus is for use in industry in the classification, separation and removal of undesirable material from that of commercial value, with special reference to the treatment of minerals and ores in the finer sizes.

It is specifically adapted to the concentration of low grade iron ores, giving a shipping product in a single operation with low iron loss in the rejects, and to coal preparation in the fine sizes, with separation and removal of pyrite and gangue matter from the coal, and the removal of colloidal material from phosphate rock, and for the concentration of metallic value in tailings from previous ore treatment, and as a classifier for general purposes.

In the preferred embodiment of the invention, its operation is based on a continuous upflow of water distributed over the entire concentration area of the apparatus by means of a porous medium, so that with proper adjustment of water input, and proper adjustment of the overflow as to height above the porous medium, both depending on the material to be treated, any fine ground material added to the rising water will separate into the light particles which are carried upwardly to discharge, and the heavier particles which settle and are removed at the lower part of the apparatus.

Particularly important is the porous medium, which preferably is in the form of a layer of shot or metallic spheres forming spheroid interstices between the spheres, which spatial relationship brings about an increase, decrease, and diminshed increase in velocity, repeating itself through a plurality of actions, so that on emanation from the top surface of the porous layer, the flowing fluid diffuses in contrast to forming localized currents, thus giving a perfectly even flow of water throughout the top surface of the porous layer without any predominant current. This upstream is continuous and over the entire bed, and where a plurality of sections are provided, the upstream is of the same characteristic action throughout with respect to each section.

The invention consists in the porous medium; in the provision of a plurality of sections each having a porous medium with water intake below and discharges above; in the intake of material above and passing substantially over the porous medium while being subjected to the upward stream; in the regulation of the intake water for any section and for the discharge of lighter and heavier materials.

More particularly the invention consists in a container, divided into a water pressure box at its lower section and an active area in its upper section by a porous medium consisting of heavy small size spherical material to cause an even distribution of water at the surface of the porous medium when water is applied under pressure from below, and provided with an overflow at its upper surface and a trap near the discharge end of the porous medium.

Also the invention consists in a novel process of maintaining the material to be classified and separated in a mass of liquid free from localized currents therein for holding the disassociated constituents in suspension in the mass of liquid in levels in respect to the upstream of liquid proportionate to their specific gravities and sizes. The process also consists in passing water under pressure continuously upwardly through a porous medium to provide equal distribution of the water, and into a water medium containing mineral particles in suspension, and in sufficient volume to cause the lighter particles of the mineral to rise to the point of removal and permit the heavier particles of the mineral to settle through the uprising flow of water and light particles therein to near the surface porous medium to form an ambient layer to be separately withdrawn.

The invention will be more fully described hereinafter, embodiments shown in the drawings, and the invention will be finally pointed out in the claims.

In the accompanying drawings—

Fig. 1 is a longitudinal vertical central section of the improved apparatus taken on line I—I of Fig. 2;

Fig. 2 is a plan view thereof, partly broken away;

Fig. 3 is a diagrammatic view of a container to show the action of the up flow upon the material and its stratification; the layers shown more or less contacting in practice, the spaces between the layers shown being only for illustrative purposes;

Fig. 4 is a vertical section of several spheres, diagrammatically shown to show the freedom of currents of the liquid above the sphere;

Fig. 5 shows the spheres upon each other to illustrate the spandrel space therebetween;

Fig. 6 is a vertical view to show the spandrel-like space and the upward currents;

Fig. 7 is a perspective view of part of the porous medium;

Fig. 8 is a vertical view of part of the porous layer of a modified form to show different sizes of spheres; and Fig. 9 is a vertical section of the discharges.

Similar characters of reference indicate corresponding parts throughout the various views.

Referring to the drawings, and more particularly to Fig. 1, the tank 10 has end walls 11 and 12, and bottom 13, with side walls 14 and 15 (Fig. 2). Along the side wall 14, spaced openings 16 are provided through which pipes 17 pass which extend across the tank near its bottom 13, and are provided with openings 18. These pipes have a one inch diameter, with 1/8" holes, and about 16 holes to the length. Control valves 19 are supplied to control the flow in each pipe, which flow can be varied in each pipe, and the parallel pipes are supplied by a main supply or header pipe 20 with a control valve 21. A vertical supply pipe 21a leads to a tank 21b for the water supply, which, however, may be obtained from any suitable source. The other and opposite side wall 15 is also provided with a plurality of spaced openings 23, through which outlet pipes 24 pass, the arrows 25 showing the direction of the discharge flow. In the end wall 11 another series of openings 26a are provided, through which pipes 26 pass, which are elbow shaped, with a horizontal portion 27 and vertical dependent 28. The lower end of the portion 28 is telescopically adjustable by the sleeve 28a as to height above the porous medium to be described. The horizontal branch 27 is for the discharge of the heavy material or concentrate.

Referring to Fig. 1, the end wall 12 has a feed inlet 30 of trough shape. Extending from the bottom 13 are a plurality of vertical partitions 31 which form transverse cells, each cell being supplied with water from the pipes 17. Covering all of these partitions 31 in the embodiment shown, and supported by abutments 32 of the end walls is a porous layer placed upon a screen 37 upon which shot is placed. This porous layer 35 extends above each of the pressure walls 34. The shot 36 is preferably one inch deep, either of uniform size or preferably of gradually smaller size, as shown in Fig. 8, with at least 1/2" of #10 shot, 1 3/4 mm. in size on top. Screens 37 like the known fly screen mesh embrace the shot above and below to hold it in position as in Fig. 8, but the upper screen can be omitted as shown in Fig. 1. The presence of the upper screen facilitates cleaning of the balls by a hose, in that the balls are not displaced by the force of the cleaning water.

A frame 37a may be used to hold the screen in position as shown.

Above the partitions 31 but vertically spaced therefrom are baffles 40 suitably supported at their end by the side walls, and these baffles 40 form compartments 41, 41a, 41b, 41c and 41d. Within these compartments, troughs 45 are provided having upper ends 46 over which the liquid flows and then discharges into the pipes 24. The fluid must overflow the rims 46 of the cups before it can enter the discharge pipes 24. A V-shaped guide 46a with an enclosed bottom 46b guides the overflow into the pipes 24. The outlet pipes 24 may be successively lower as generally shown in Fig. 9, instead of on the same level as in Fig. 1. Parallel with the baffles 40, which extend upwardly beyond the cups or shields 45, and forming a wall of the compartment 41c is an extended baffle 47 which is adjustable in guide walls 47a and extends almost to the porous layer 35. The compartment 41d formed by this adjustable baffle 47 and the end wall 11 has therein the before described heavy material or discharge pipes 26. It will be noted that the rims of the discharge cups are each higher than any of the openings of the discharge pipes 26. It will also be noted that the discharge opening 24 is higher than the horizontal leg 27 of pipes 26. This provides a difference in heads sufficient to insure the movement of the concentrates through the space 52 from the compartment 46 to the discharge compartment 41d.

The operation is as follows:

Each of the cells 34 is filled with water, which is subject to a back pressure because of the porous layer, which water passes through the porous layer, but rises over the entire surface of the porous layer of each section with an even, diffusive, non-circulating flow. The material to be treated is fed into the feed inlet trough 30. The heavy material descends towards the porous layer 35 and is subjected to the action of the diffusion flow of the water. Certain of the lighter materials rise to the overflow rim of the cup of compartment 41. Certain other lighter material rises as shown by the arrows 51a to the overflow of the cup in compartment 41a and successively in compartments 41b and 41c. The lighter material thus separating, other light material is moved upwardly from the porous layer as the diffusion flow passes through the heavier materials streaming in the direction of the arrows 51b to the regulated discharge space 52 below the baffle 47.

Certain of the heavier material may move upwardly with the diffusion flow, but its specific gravity will cause it to descend though moved along in the direction of the arrows 51b. In fact, the even flow is such that the material constituents held in suspension by the water flow arrange themselves in accordance with their respective sizes and specific gravities doing this automatically, there being a relation between the respective specific gravities having a downward tendency and the velocity of upward flow acting against the different surface areas of the different sizes of the constituents. I have found that to accomplish this graduated suspension it is important that the flow have no localized current therein as this would disturb the equilibrium and carry the heavier materials with its overflow.

Finally, the concentrate passes automatically through the outlet 52, as it is formed and guided thereto. The lightest particles pass into the compartments 41 to 41c, the heaviest concentrates through the outlet 52 and into the compartment 41d.

Thus, with a stream of material to be separated entering at the inlet trough and moving in a general horizontal from right to left, in this embodiment, to the outlet 52, with the diffusion flow rising perpendicularly to the material flow into separate compartments above the material flow, the several constituents depending on their sizes and specific gravity are graduatingly classified and separately discharged, with the remaining concentrate from which the lighter particles have been separated, also separately discharged.

Thus by the diffusion flow of the water and the minerals being subjected thereto, the stratification is controlled substantially automatically as generally shown in Figure 3.

No material can descend through the porous layer because of the upward flow of even tenor throughout, which acts near the top surface of the layer in a lambent manner. When upstream water does not pass through the porous layer even the finest material cannot pass downwardly through the porous layer.

The improved method flows from the recognition that the various constituents in ore have different sizes and specific gravities and that equilibrium may be obtained by an upflow of water. In prior processes, the constituents were separated, to a certain extent, by the use of pipes with a contracted flow and high velocity. I subject the constituents to an evenly distributed upward flow of low velocity, whereby these constituents are suspended and separated in layers, as generally shown in Fig. 3. In Figure 3 blank spaces are shown, in view of the difficulty in drawings to show merging of one layer in another. It is, however, not the ratio of the weight of any volume of a solid to the weight of an equal volume of water which alone controls but further, the sizes or the surface area in relation to an even upward mass of water. Under such conditions, each particle finds its own state of equilibrium. The separation is facilitated by the direction of the substance to be separated moving perpendicularly to the direction of the water and for commercial purposes the substance is fed at one end substantially horizontally (after its hopper descent) across the tops of the various cells or along and above the porous layer as shown in Fig. 1. In the diagrammatic Figure 3 the inflow of the substance to be separated is also substantially horizontal after it leaves the feeding funnel and in that case radially outward to be then disassociated by the lambent contact of the water in its upward amble without current formation. As an entirety the body of water moving from the water inlets to the water outlets may be said to have a current flow, but it is distinctly pointed out that there are no separate localized currents. Localized currents of this kind were used in the prior art and did not give satisfaction since particles, and particularly the heavy ones settled close to the current's origin which is always accompanied with a partial vacuum action or suction as illustrated by the ordinary garden hose nozzle, which, when acting in a mass of water sets up eddy currents the general resultant of which is to draw the heavier particles thereto. Contrary to this, instead of using one layer of spheres between which spaces water would form jets, a plurality of layers of spheres are used so as to compel an undulating or meandering flow therethrough to the end that at the top surface of the porous layer an evenness of discharge takes place. As Fig. 4 well illustrates, fluid reaching the narrowest constriction of space between the spheres spreads out in the constantly increasing spandrel-like volume 60 until it reaches a level slightly below a plane tangential to the tops of the spheres and when the fluid reaches this plane the various volumetric spandrels merge with each other forcing one mass of water 71 throughout the top of porous layer. This upward flow continues until the water reaches the level of the outlet cups, where it is discharged. This action continues, a brief space acting to prime the apparatus, when the substance to be treated is supplied and the separation actions above described take place and continue as long as desired. At all times, the operative column of water diffuses upwardly. In Figure 5 the horizontal spandrel 72 is shown. In Figure 6 the vertical space is shown with the velocity diminishing at 73. In Figure 8 the smallest spheres 36a are shown on top, the larger 36b on the bottom.

It will be particularly noted that a relatively small amount of water compared to the amounts used by the prior art installations, is required, when certain substances, such as phosphates are being separated.

The method then is to subject substances as an ore ground for instance, to the action of an evenly moving mass of a liquid exerting a force opposed to the direction of gravity, to hold in suspension the various constituents of the substance at various levels in direct relation to their sizes and their specific gravities, and then separately removing the material in suspension. The method shows an upward flow of water in contrast to the specific gravity force action acting upon different sizes of constituents in which absence of localized currents is essential.

In the porous medium or diffuser, the spheres may be of the same sizes or arranged in different layers of graduated sizes as described functioning to break up any current formation or prevent the formation of currents at the upper outlet side.

The overflow trough may be substituted by any other form of overflow device, in fact the overflow may pass directly into the pipes, but the trough shown is preferred, and this may be regulated as to height with the outlet pipes disposed to be lowered progressively as shown in Figure 9.

While the plurality of back pressure cells with their individually controlled inlet pipes have the advantage of controlling each separate cell flow and to a large extent each separate compartment flow, without setting up harmful currents, and are preferred, forming part of the specific invention described, in the broader aspect of the invention the cell forming partitions and individual water supply pipes may be dispensed with; and one body of water moved upwardly through a diffuser which in such a case need not be so intensive in its action, sufficient however to prevent any circulatory actions of the incoming water supply to create disturbances in the upward diffusing movement of the water mass when it meets the particles to be separated.

For a substance which is constant in its constituents, the outlet gauge need not be adjustable, or after it once has been determined upon. The apparatus shown in Fig. 1 can be assigned for the treatment of only one substance, in which the variously regulated parts are then fixed, or it can be used in its universal form as shown.

Essential however is an apparatus to assure a mass of liquid moving contrary to the downward force of gravity and regulating the flow of this mass without the formation of harmful currents, in ratio to the size and specific gravity of the respective constituents of the substance to be separated.

It is advantageous to run a test of the apparatus on a specimen, since the hindered settling varies with the character of the tailings and head in the case of ores, and their dressing, and their interstitial ratio.

I have described several forms of my invention, but obviously various changes may be made in the details disclosed without departing from

What I claim is:

1. The method of hydraulic separation of the mineral constituents of ground ores in the finer sizes, which consists in subjecting the disassociated constituents of such ore to the continuous even flow of a mass of water free from separate current therein and under diffusion distribution moving upwards at low velocity regulated in relation to the disassociated constituents of such ore, said constituents arranging themselves in respect to their specific gravity for forming an ambient horizontal layer having an upper and lower unimpeded horizontal boundary by the lambent contact of the water in upward amble, in which the high gravity constituent is in suspension at its own state of equilibrium in respect to said upwardly moving water mass settling from the low specific gravity constituent which flows off with the water, subjecting the lowest part of the high gravity constituents in suspension to the action of a communicating column of like constituents in suspension in an uprising water mass, and subjecting further quantities of such ores to the first mentioned mass of water, whereby high gravity constituent concentrate in suspension passes to said communicating column for discharge.

2. In an apparatus for the separation of ore of the finer sizes having a tank for receiving the materials to be treated having a horizontal bottom and four walls, the combination of a horizontal partition parallel with and spaced from said bottom and dividing the tank into upper and lower parts, water supply means below the horizontal partition for supplying water to the lower horizontal part for flow to the upper horizontal part of the tank, a layer on said partition including a plurality of horizontally and vertically disposed members arranged in a superposed series providing substantially equal spaces therebetween and along the top and bottom of said members, said spaces corresponding in number and sizes substantially to those formed by number ten shot at least one half inch in depth, for distributing the volume of water equally per unit area velocity over the lower surface of said layer and providing a diffusion flow of water over the entire upper surface of said layer, without separate currents, a vertical partition dividing the upper horizontal part of the tank vertically into two vertical parts, a receiving part and a discharge part, said partition having its lower end spaced from the upper surface of said layer on said horizontal partition for forming a space intercommunicating said receiving and discharge parts, a vertical partition in the lower horizontal part, aligned with the spaced vertical partition in the upper horizontal part, forming separate water supply compartments below the horizontal partition, controlled means for said water supply means for each of said water supply compartments, an outlet in the discharge part, the height of which outlet is adjusted and determined by the relation of the flow of water to the high gravity constituent of the ore to hold it in suspension, said outlet being above the lower end of said spaced vertical partition, and horizontally intermediary an unbroken space in said receiving part and below the level of the water therein, and an outlet in the receiving part higher than the outlet of the discharge part, whereby the disassociated constituents of the ground ore of the finer sizes is subjected in the receiving column to said upward flow of water mass free from separate currents, the constituents of high specific gravity being in suspension against said upward flow as a concentrate and pass through the space below the upper vertical partition into the discharge part, and to the discharge part outlet while the constituents of low specific gravity above said concentrate discharge with said upward flow of water through the receiving part discharge outlet.

WILLIAM C. LAUGHLIN.

REFERENCES CITED

The following references are of record in the file of this patent:

UNITED STATES PATENTS

| Number | Name | Date |
|---|---|---|
| 2,309,275 | Remer | Jan. 26, 1943 |
| 320,756 | Card | June 23, 1885 |
| 2,293,033 | Mead | Aug. 18, 1942 |
| 1,715,693 | Bird | June 4, 1929 |
| 2,138,810 | Wood | Nov. 29, 1938 |
| 1,452,815 | Reed | Apr. 24, 1923 |
| 132,336 | Utsch | Oct. 15, 1872 |
| 2,105,126 | Pellett | Jan. 11, 1938 |
| 2,301,927 | Fahrenwald | Nov. 17, 1942 |
| 2,230,872 | Maust | Feb. 4, 1941 |
| 2,074,977 | Bird et al. | Mar. 23, 1937 |
| 1,490,420 | Elder | Apr. 15, 1924 |
| 1,440,129 | Borcherdt | Dec. 26, 1922 |
| 901,474 | Richards | Oct. 20, 1908 |

FOREIGN PATENTS

| Number | Country | Date |
|---|---|---|
| 278,561 C. A. | British | Oct. 13, 1927 |